(12) United States Patent
Imai

(10) Patent No.: US 8,947,729 B2
(45) Date of Patent: Feb. 3, 2015

(54) COLOR PROCESSING APPARATUS, COLOR PROCESSING METHOD AND STORAGE MEDIUM

(75) Inventor: Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 13/296,147

(22) Filed: Nov. 14, 2011

(65) Prior Publication Data

US 2012/0147392 A1 Jun. 14, 2012

(30) Foreign Application Priority Data

Dec. 13, 2010 (JP) ................. 2010-277420

(51) Int. Cl.
*H04N 1/54* (2006.01)
*H04N 1/56* (2006.01)
*H04N 1/60* (2006.01)
*G03F 3/00* (2006.01)

(52) U.S. Cl.
CPC .......... *H04N 1/6058* (2013.01); *H04N 1/6088* (2013.01)
USPC ............ 358/1.9; 358/504; 358/505; 358/515; 358/518; 382/167; 345/590; 345/591; 345/604; 348/33; 348/34

(58) Field of Classification Search
None
See application file for complete search history.

(56) References Cited

U.S. PATENT DOCUMENTS

| | | | | |
|---|---|---|---|---|
| 5,619,427 A | * | 4/1997 | Ohkubo | 358/523 |
| 5,771,311 A | * | 6/1998 | Arai | 382/162 |
| 5,929,906 A | * | 7/1999 | Arai et al. | 348/223.1 |
| 7,929,760 B2 | | 4/2011 | Tamagawa | 382/167 |
| 2007/0230777 A1 | * | 10/2007 | Tamagawa | 382/162 |
| 2007/0263265 A1 | * | 11/2007 | Sekine | 358/518 |
| 2008/0170278 A1 | | 7/2008 | Imai | 358/515 |
| 2009/0153906 A1 | | 6/2009 | Ito | 358/3.01 |
| 2009/0185232 A1 | | 7/2009 | Hoshii et al. | 358/3.23 |
| 2009/0257648 A1 | * | 10/2009 | Edge | 382/162 |
| 2010/0079829 A1 | * | 4/2010 | Edge | 358/504 |
| 2011/0026053 A1 | * | 2/2011 | Gil et al. | 358/1.9 |
| 2011/0026821 A1 | * | 2/2011 | Edge | 382/167 |
| 2011/0033108 A1 | * | 2/2011 | Tin | 382/167 |

(Continued)

FOREIGN PATENT DOCUMENTS

| | | |
|---|---|---|
| JP | 2002-221931 | 8/2002 |
| JP | 2002-300415 | 10/2002 |
| JP | 2007-274586 | 10/2007 |

(Continued)

*Primary Examiner* — Beniyam Menberu
(74) *Attorney, Agent, or Firm* — Fitzpatrick, Cella, Harper & Scinto

(57) ABSTRACT

There is provided a color processing apparatus comprising: a calculation unit configured to calculate, for each of a plurality of light sources, a first colorimetric value that is obtained by measuring a color having a spectral reflectance indicated by spectral reflectance information under the light source; a mapping unit configured to obtain, for each of the plurality of light sources, a second colorimetric value by mapping the first colorimetric value of the light source within a gamut under the light source; a color separation unit configured to obtain the output information from a plurality of the second colorimetric values, by adjusting the output information such that an error between a colorimetric value obtained by measuring a color output by the image output apparatus according to the output information under each of the light sources and the second colorimetric value for the light source is minimized.

8 Claims, 9 Drawing Sheets

(56) References Cited

U.S. PATENT DOCUMENTS

2011/0075923 A1   3/2011  Imai ............................. 382/167
2011/0149307 A1*  6/2011  Tin ............................... 358/1.9

FOREIGN PATENT DOCUMENTS

| JP | 2009-147632 | 7/2009 |
|---|---|---|
| JP | 2009-171556 | 7/2009 |

* cited by examiner

FIG. 5

| PATCH NO. | Cyan | Magenta | Yellow | Black | Red | Green | Blue |
|---|---|---|---|---|---|---|---|
| 1 | 0 | 0 | 0 | 0 | 0 | 0 | 0 |
| 2 | 0 | 0 | 0 | 0 | 0 | 0 | 16384 |
| 3 | 0 | 0 | 0 | 0 | 0 | 0 | 32768 |
| 4 | 0 | 0 | 0 | 0 | 0 | 0 | 49152 |
| 5 | 0 | 0 | 0 | 0 | 0 | 0 | 65535 |
| 6 | 0 | 0 | 0 | 0 | 0 | 16384 | 0 |
| ... | ... | ... | ... | ... | ... | ... | ... |
| 78124 | 65535 | 65535 | 65535 | 65535 | 65535 | 65535 | 49152 |
| 78125 | 65535 | 65535 | 65535 | 65535 | 65535 | 65535 | 65535 |

COLOR PROCESSING APPARATUS, COLOR PROCESSING METHOD AND STORAGE MEDIUM

BACKGROUND OF THE INVENTION

1. Field of the Invention

The present invention relates to a technique for reproducing the color of a subject with high accuracy, and in particular relates to a technique for reproducing the color of the subject under various light sources.

2. Description of the Related Art

There has recently been an increased demand for faithfully expressing the color of the subject when outputting an image. For this reason, a technique for reproducing the color of the subject under a specific light source designated as the observation environment (colorimetric color reproduction) has been developed. However, recently, a technique for reproducing the color of the subject under arbitrary environmental conditions, for example, an arbitrary light source, (spectral color reproduction) has been drawing more attention. In spectral color reproduction, an image is output such that the spectral reflectance of the subject in the output image is close to the actual spectral reflectance of the subject.

However, the types of color components that an image output apparatus such as a printing apparatus can use are limited. Therefore, it is difficult to precisely reproduce the spectral reflectance of the subject in the entire visible wavelength range. For this reason, a method for reproducing color such that the colorimetric value of the subject in the output image is close to the actual colorimetric value of the subject under a number of predetermined light sources has been proposed.

For example, in the techniques disclosed in Japanese Patent Laid-Open Nos. 2009-171556 and 2009-147632, a color difference ΔE between a target color observed under a certain light source and the color reproduced under the light source that is estimated based on the amount of color material used by the printing apparatus is calculated for a number of predetermined light sources. Then, the amount of color material is determined such that the value obtained by performing weighted addition on the color differences ΔE for each of the light sources is reduced.

The gamut that the image output apparatus is capable of outputting differs depending on the light source used in observation. However, in the techniques disclosed in Japanese Patent Laid-Open Nos. 2009-171556 and 2009-147632, no consideration is given to the gamut that the image output apparatus is capable of outputting. Accordingly, in the case where the color of the subject is out of the gamut that the image output apparatus is capable of outputting, the tones of the color of the subject may not be maintained.

SUMMARY OF THE INVENTION

The present invention aims to reproduce the color of the subject with higher quality under various light sources.

According to one aspect of the present invention, a color processing apparatus that calculates, from spectral reflectance information that indicates spectral characteristics of a color, output information that indicates an intensity of each of a plurality of color components that an image output apparatus uses for outputting the color, comprises: an acquisition unit configured to acquire the spectral reflectance information; a calculation unit configured to calculate, for each of a plurality of light sources, a first colorimetric value that is obtained by measuring a color having a spectral reflectance indicated by the spectral reflectance information under the light source; a mapping unit configured to obtain, for each of the plurality of light sources, a second colorimetric value by mapping the first colorimetric value of the light source within a gamut that indicates a colorimetric value range of a color that the image output apparatus can output under the light source; a color separation unit configured to obtain the output information from a plurality of the second colorimetric values, by adjusting the output information such that an error between a colorimetric value obtained by measuring a color output by the image output apparatus according to the output information under each of the light sources and the second colorimetric value for the light source is minimized; and an output unit configured to output the output information.

According to another aspect of the present invention, a color processing method for calculating, from spectral reflectance information that indicates spectral characteristics of a color, output information that indicates an intensity of each of a plurality of color components that an image output apparatus uses for outputting the color, comprises the steps of: acquiring the spectral reflectance information; calculating, for each of a plurality of light sources, a first colorimetric value that is obtained by measuring a color having a spectral reflectance indicated by the spectral reflectance information under the light source; obtaining, for each of the plurality of light sources, a second colorimetric value by mapping the first colorimetric value of the light source within a gamut that indicates a colorimetric value range of a color that the image output apparatus can output under the light source; obtaining the output information from a plurality of the second colorimetric values, by adjusting the output information such that an error between a colorimetric value obtained by measuring a color output by the image output apparatus according to the output information under each of the light sources and the second colorimetric value for the light source is minimized; and outputting the output information.

According to the aspects of the invention, the color of the subject can be reproduced with higher quality under various light sources.

Further features of the present invention will become apparent from the following description of exemplary embodiments with reference to the attached drawings.

BRIEF DESCRIPTION OF THE DRAWINGS

FIG. 5 shows an example of output signals for outputting the patch image shown in FIG. 4.

DESCRIPTION OF THE EMBODIMENTS

Hereinafter, exemplary embodiments of the present invention will be described in detail with reference to the attached drawings. The following embodiments are not intended to limit the scope of the claims of the present invention, and not all combinations of features described in the embodiments are essential to the present invention. The image output apparatus constituting the present invention is not limited to the configurations described below, and the embodiments are not limited thereto as long as sufficient accuracy is obtained in order to perform spectral reflectance reproduction.

[Embodiment 1]

Figure 2:
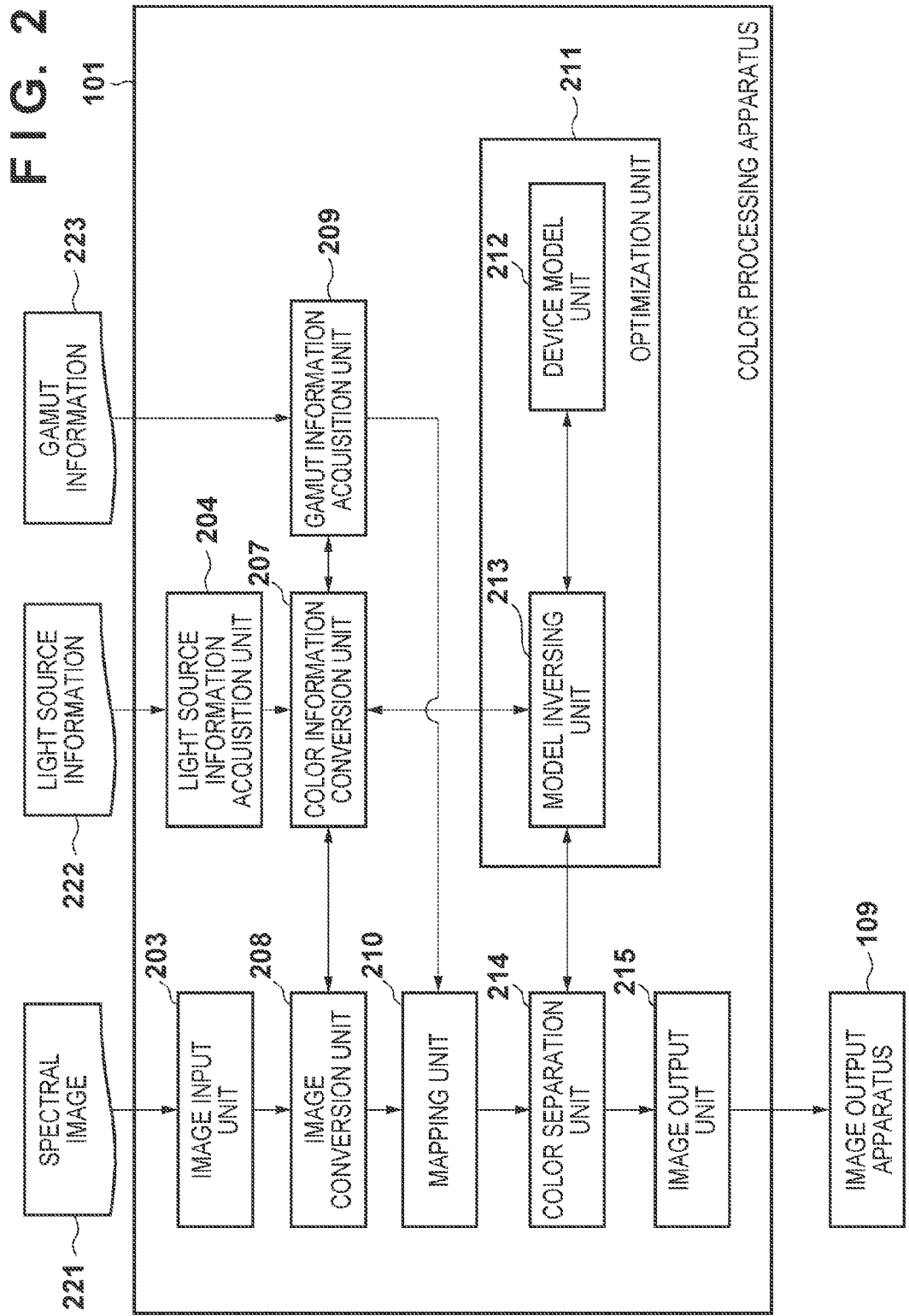
FIG. 2 is a block diagram illustrating a configuration of a color processing apparatus in Embodiment 1.

Embodiment 1 of the present invention will be described below. FIG. 2 is a block diagram illustrating a functional configuration of a color processing apparatus according to the present embodiment. A color processing apparatus 101 according to the present embodiment acquires a spectral image 221 (spectral reflectance information) and generates an output signal that will be sent to an image output apparatus 109. In the description given below, the image output apparatus 109 according to the present embodiment is assumed to be an ink-jet color printer including seven colors of inks (color components), namely, cyan C, magenta M, yellow Y, black K, red R, green G, and blue B. However, the number of ink types may be different, or inks of other colors may be used. Also, a color processing apparatus that employs an image output method other than the ink-jet system may be used.

The ink-jet color printer receives, as an input signal, an ink value for each pixel. The ink value is 16-bit data that takes a value ranging from 0 to 65535. The ink value indicates the output intensity of the colors. If the ink value of a certain ink is 0, it indicates that the ink will not be ejected. Accordingly, the color processing apparatus 101 of the present embodiment converts the spectral reflectance into a set of ink values of C, M, Y, K, R, G, and B for each pixel of the spectral image 221. Then, an image output unit 215 (described below) of the color processing apparatus 101 outputs a set of calculated ink values to the image output apparatus 109 as an output signal.

Figure 1:
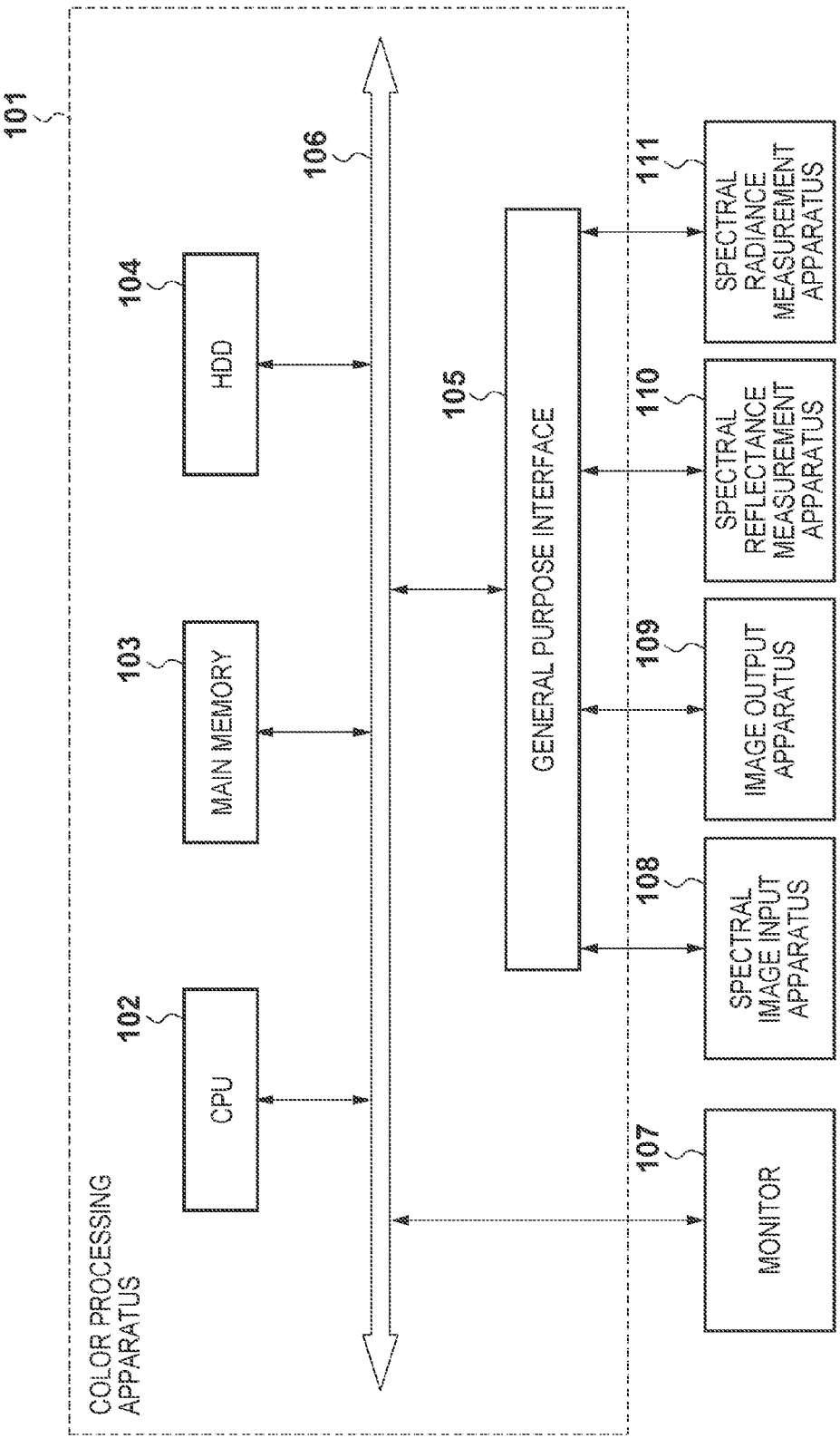
FIG. 1 is a block diagram illustrating a configuration of a color processing apparatus in Embodiment 2.

Also, the color processing apparatus 101 according to the present embodiment may be further connected to a monitor 107, a spectral image input apparatus 108, a spectral reflectance measurement apparatus 110 and a spectral radiance measurement apparatus 111, as shown in FIG. 1. The color processing apparatus 101 may exchange information with these apparatuses via a storage medium, for example.

The monitor 107 is a display apparatus that displays information sent from the color processing apparatus 101. The spectral image input apparatus 108 generates a spectral image in which the spectral reflectance for each pixel is recorded. The spectral image input apparatus 108 can be, for example, an apparatus that acquires the spectral reflectance of a subject for each pixel, such as a multiband camera, multiband scanner and the like. The spectral image input apparatus 108 may be a computer that performs at least one of creation, processing and editing of the spectral image. The spectral reflectance measurement apparatus 110 measures the spectral reflectance of a patch image that is formed by the image output apparatus 109 on a recording medium. The spectral radiance measurement apparatus 111 measures the spectral radiance distribution under a light source.

The color processing apparatus 101 according to the present embodiment includes the units shown in FIG. 2. In the present embodiment, the units shown in FIG. 2 are configured by dedicated hardware. However, as shown in FIG. 1, each unit shown in FIG. 2 may be configured using a computer (this will be described in Embodiment 2). The units of the color processing apparatus 101 will be described below. An image input unit 203 acquires the spectral image 221 (acquisition unit). For example, the image input unit 203 acquires the spectral image 221 by controlling the spectral image input apparatus 108 or a storage apparatus (not shown in the drawings).

The spectral image 221 includes the spectral reflectance for each pixel as data. The spectral image 221 can be acquired by using an apparatus that is capable of acquiring the spectral reflectance of a subject for each pixel, such as a multiband image input apparatus. It is also possible to generate the spectral image 221 using a program capable of creating, processing and editing a spectral image. The spectral image 221 may be data holding the spectral radiance for each pixel. In this case, the image input unit 203 can convert the spectral radiance into the spectral reflectance, while taking into account the spectral radiance of the environmental light when the spectral image 221 is captured.

In the present embodiment, the spectral reflectance and the spectral radiance are called spectral characteristics. In the present embodiment, the spectral characteristic data is assumed to be 36-channel data sampled at an interval of 10 nm across the range from 380 nm to 730 nm. That is, the spectral reflectance is the light reflectance of a subject for each wavelength, and the spectral radiance is the light intensity for each wavelength. However, the format of the spectral characteristic data is not limited thereto. For example, the spectral characteristic data may be data sampled at an interval of 5 nm. Also, the sampling range may be different from the above-described range, as long as the range sufficiently covers the visible light wavelength range. The number of channels of the spectral characteristic data is generally more than three. The spectral characteristics may be expressed as a linear combination of waveforms (vectors). In this case, the weight of each waveform corresponds to the spectral characteristic data.

It is not necessary to directly acquire the spectral reflectance for all pixels. For example, it is possible to estimate the spectral characteristics based on a multiband image that includes color information of more than three primary colors, for example, color information of approximately six to sixteen channels. In the technique disclosed in Japanese Patent Laid-Open No. 2002-221931, a multiband image that has 6-channel data for each pixel is acquired using an image input apparatus including six types of color filters. Then, it is possible to estimate the spectral reflectance of a subject from the multiband image using the Wiener estimation matrix or the like. The Wiener estimation matrix can be derived from the spectral reflectance of a plurality of color charts, which has been measured in advance, and a combination of signal values of the multiband image. The multiband image input apparatus is called a multiband camera, multiband scanner, or the like, depending on its configuration.

The light source information acquisition unit 204 acquires information on the light source, which is considered when color reproduction is performed in the present embodiment. The types of light sources to be considered can be determined by an arbitrary method. For example, the types of light sources to be considered may be determined based on a user input. In the present embodiment, five types of light sources, namely, D65, A, F2, F7 and F11 are considered in performing color reproduction. In this case, the light source information acquisition unit 204 acquires the spectral radiance data for each of the five types of light sources D65, A, F2, F7 and F11, as light source information 222. The spectral radiance data of the light source may be stored in a storage medium (not shown in the drawings) of the color processing apparatus 101. Also, the spectral radiance data of the light source may be input by the user as appropriate. In addition, the light source information acquisition unit 204 may acquire the spectral radiance data of the light source by driving the spectral radiance measurement apparatus 111.

In the present embodiment, the light source information acquisition unit 204 may acquire the priorities of the light sources. In the present embodiment, D65 has the highest priority, and A, F2, F7 and F11 respectively have the second, third, fourth and fifth priority. The method for setting the priorities of the light sources is not limited thereto. For example, a coefficient indicating the weight of each light source may be predetermined, and the priorities can be set using the coefficient. The priorities may also be determined according to an instruction from the user.

A color information conversion unit 207 converts the spectral reflectance into device-independent color information (calculation unit). In the present embodiment, Lab values are used as the device-independent color information. However, other color information such as XYZ values can be used as well. Specifically, the color information conversion unit 207 calculates, using the spectral reflectance of a color and the spectral radiance data of a light source, the colorimetric value (first colorimetric value) of the color measured under that light source.

An image conversion unit 208 converts the spectral reflectance of each pixel of the spectral image 221 into the device-independent color information (first color information) for each light source, according to the spectral radiance of each light source acquired by the light source information acquisition unit 204. The first color information indicates the color obtained when an object having a certain spectral reflectance is measured under a designated light source. That is, the first color information can be colorimetric color information. Specifically, the image conversion unit 208 sends the spectral reflectance of each pixel to the color information conversion unit 207, and acquires converted color information. In the present embodiment, five types of light sources, namely, D65, A, F2, F7 and F11, are considered.

In the present embodiment, color information in uniform color space is used as the device-independent color information, and particularly, the Lab values in the CIELAB color space are used. Accordingly, the image conversion unit 208 generates the Lab image for each of the five types of light sources. Of course, other device-independent color information such as that in the XYZ color space may be used. Also, color information in the L*u*v* color space or according to CIECAM02 may be used.

A gamut information acquisition unit 209 acquires the gamut that the image output apparatus 109 is capable of outputting. In the present embodiment, the gamut information acquisition unit 209 acquires gamut information 223 that indicates the range of the spectral reflectance in which the image output apparatus 109 is capable of outputting. Then, the gamut information acquisition unit 209 causes the color information conversion unit 207 to perform processing, thereby converting the spectral reflectance into the device-independent color information under each of the five types of light sources. In this manner, the gamut information acquisition unit 209 calculates the gamut (device-independent gamut) in which the image output by the image output apparatus 109 can be expressed under each of the light sources. Specifically, in the present embodiment, the gamut information acquisition unit 209 calculates the gamut in the Lab color space for each of the five types of light sources. At this time, a below-described optimization unit 211 may be used as necessary.

In the present embodiment, the gamut information 223 indicates the spectral reflectance. However, the gamut information 223 may indicate the gamut in which an image output by the image output apparatus 109 can be expressed under each light source. In this case, it is sufficient that the gamut information acquisition unit 209 acquires the gamut information 223 for each of the five types of light sources. The gamut information 223 may be stored in a storage apparatus (not shown in the drawings) of the color processing apparatus 101. Also, the gamut information acquisition unit 209 may generate the gamut information 223 as appropriate.

The gamut information 223 can be generated as described below. Specifically, a patch image generation unit (not shown in the drawings) in the color processing apparatus 101 generates patch image data based on the color material composition of the image output apparatus 109. In the present embodiment, the ink values of C, M, Y, K, R, G, and B in the patches are set to 0%, 25%, 50%, 75% or 100% of the largest ink value, as shown in FIG. 5. In this manner, 78125 sets of patch image data are generated as shown in FIG. 5.

Figure 4:
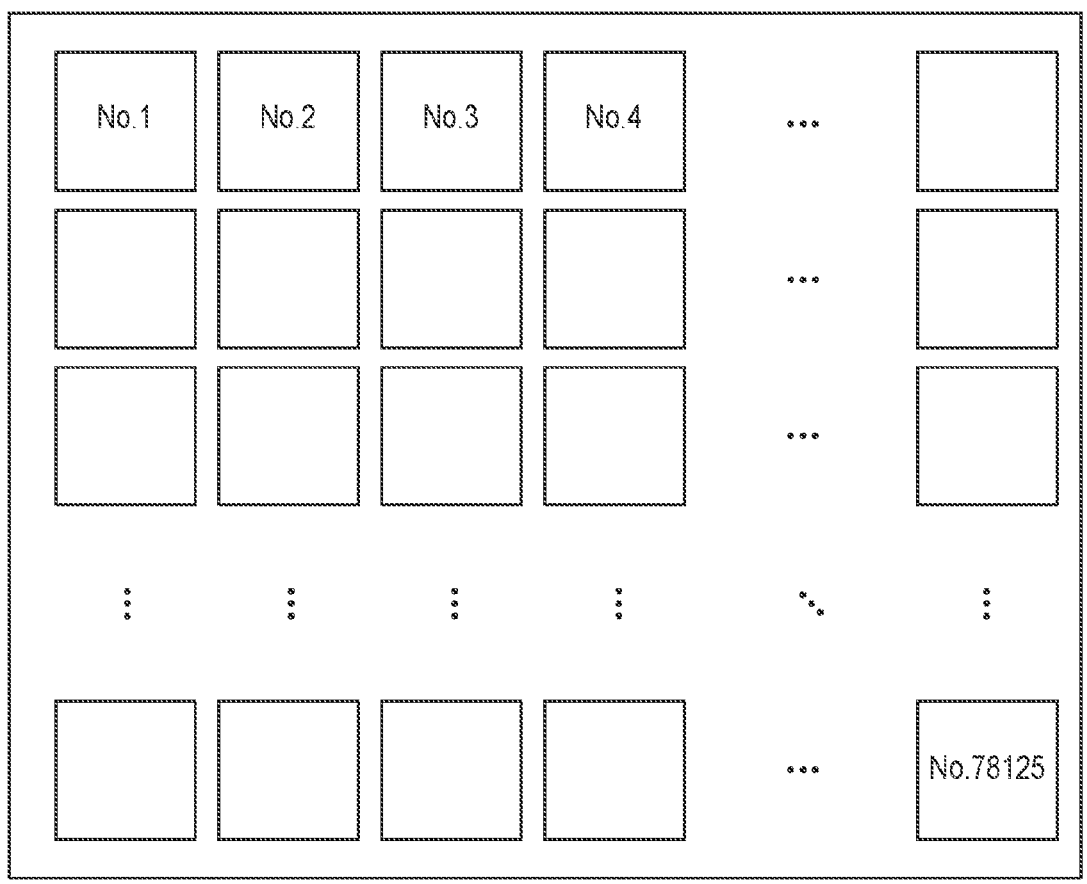
FIG. 4 shows an example of a patch image in Embodiment 1.

The patch image generation unit outputs these 78125 sets of patch image data generated in this manner to the image output apparatus 109 via the image output unit 215. At this time, the patch image can be formed on a medium that the image output apparatus 109 uses for outputting the spectral image. FIG. 4 shows an example of the output patch image. Next, the spectral reflectance of each patch is measured using the spectral reflectance measurement apparatus 110. The patch image generation unit generates the gamut information 223 by associating the spectral reflectance of each patch with the corresponding set of ink values. As another method, the patch image generation unit can estimate the spectral reflectance from the ink values using a below-described device model unit 212.

A mapping unit 210 maps the pixel values (colorimetric values) of the Lab image for each light source generated by the image conversion unit 208 within the gamut in which the image output by the image output apparatus 109 may be expressed under the light source (mapping unit). The gamut for each light source corresponds to the colorimetric value range of the color that the image output apparatus 109 may output under the light source. In this manner, the mapping unit 210 generates a color-compressed image by performing gamut compression on the Lab image. Each pixel in the color-compressed image has a pixel value (second colorimetric value) obtained by mapping. In the present embodiment, the color-compressed image is generated for each of the five types of light sources.

In the present embodiment, the mapping unit 210 can use various mapping algorithms. For example, the user can set the mapping algorithm to be used. It is possible to use, as the mapping algorithm, various gamut compression algorithms conventionally used according to the use purpose. In the present embodiment, with the mapping algorithm used by the mapping unit 210, brightness of the input image is maintained and an emphasis is placed on maintaining the tonality of the image.

For example, in the case where faithful reproduction of the color of the input image or maintaining of sharpness is desired, it is possible to map only colors that the image output apparatus 109 cannot reproduce on the outline of the gamut in which the image output apparatus 109 is capable of color reproduction. However, with this method, the tone of the color that the image output apparatus 109 cannot reproduce is not maintained. In the present embodiment, in order to place an emphasis on the tonality of the image, colors that the image output apparatus 109 can reproduce are also mapped to colors having a lower saturation.

Note that it is possible to use an algorithm that achieves the smallest color difference before and after mapping. Also, it is possible to use a method in which the blue sky, skin color and the like are mapped to colors subjectively considered to be favorable (memory color reproduction). Furthermore, it is possible to use a method that places an emphasis on maintaining hue.

Mapping performed by the mapping unit 210 in the present embodiment will be described below. In the present embodiment, Lab values are converted (mapped) within the gamut acquired by the gamut information acquisition unit 209, for all pixels of the Lab image generated by the image conversion unit 208. In this manner, L'a'b' values that are within the color reproduction range can be obtained. Hereinafter, values obtained by mapping Lab values of the Lab image within the color reproduction range of the image output apparatus 109 are called L'a'b' values. That is, five types of color-compressed images respectively corresponding to the five types of light sources are generated by the mapping processing in the present embodiment, and each pixel of the color-compressed images has L'a'b' values.

The mapping unit 210 performs mapping on each of the five types of Lab images using the corresponding gamut information. Here, the mapping unit 210 can use the same mapping algorithm for the five types of Lab images. In this manner, variation in the color of the subject that is dependent on differences in the light sources can be expressed in the output image.

Figure 7:
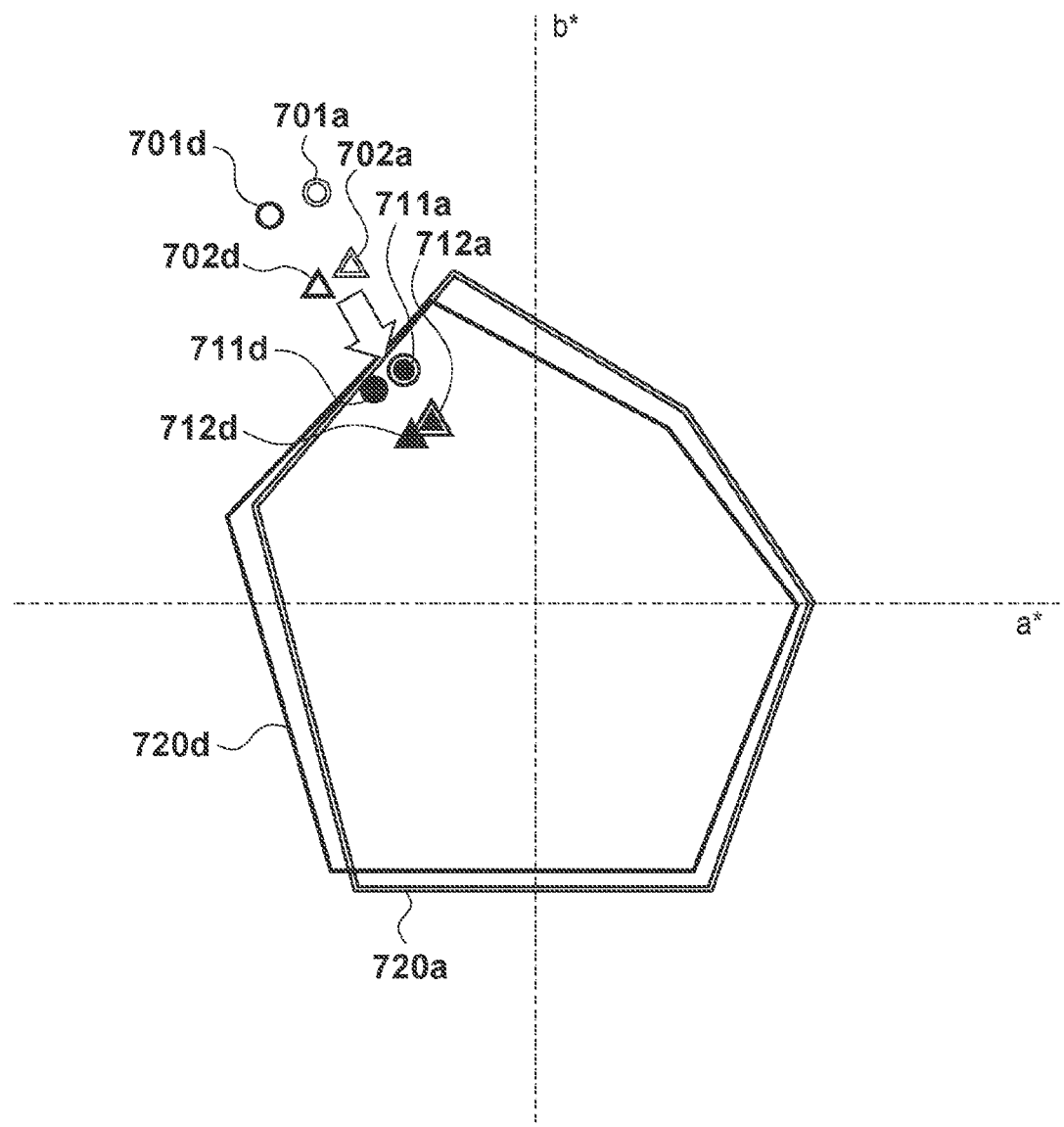
FIG. 7 illustrates an example of the gamut compression processing in Embodiment 1.

The mapping algorithm used by the mapping unit 210 will be described using FIG. 7. FIG. 7 shows the a*-b* plane. FIG. 7 illustrates mapping processing performed on a pixel 1 and a pixel 2. Although mapping processing is performed for five light sources in the present embodiment, for the sake of simplicity, FIG. 7 illustrates the mapping processing only for the D65 light source and the A light source. Also, in FIG. 7, change in the L* value is also omitted for the sake of simplicity.

In FIG. 7, reference numeral 720a indicates the color reproduction range of the image output apparatus 109 under the A light source, reference numeral 720d indicates the color reproduction range of the image output apparatus 109 under the D65 light source. Also, reference numeral 701a indicates the Lab values of the pixel 1 in the Lab image for the A light source, and reference numeral 701d indicates those for the D65 light source. Furthermore, reference numeral 702a indicates the Lab values of the pixel 2 in the Lab image for the A light source, and reference numeral 702d indicates those for the D65 light source. In FIG. 7, with respect to both the A light source and the D65 light source, both the pixel 1 and the pixel 2 are out of the color reproduction range of the image output apparatus 109. The pixel 1 and the pixel 2 have substantially the same hue, and the pixel 1 has a higher saturation than the pixel 2.

A color-compressed image is obtained from the Lab image through the mapping processing. Reference numeral 711a indicates the L'a'b' values of the pixel 1 in the color-compressed image for the A light source, and reference numeral 711d indicates those for the D65 light source. Furthermore, reference numeral 712a indicates the L'a'b' values of the pixel 2 in the color-compressed image for the A light source, and reference numeral 712d indicates those for the D65 light source. That is, 701a is mapped to 711a. Similarly, 701d is mapped to 711d, 702a is mapped to 712a, and 702d is mapped to 712d.

As described above, the same mapping algorithm can be used for the light sources. In the present embodiment, an algorithm that places an emphasis on maintaining tones is used. For example, with respect to the A light source, 701a has a higher saturation than 702a. Therefore, mapping is performed such that 711a has a higher saturation than 712a. That is, the relative positional relation between 701a and 702a is reflected in the relative positional relation between 711a and 712a. In this manner, it is possible to avoid not being able to maintain tones in the output image.

Also with respect to the D65 light source, an algorithm that is used by the A light source and places an emphasis on maintaining tones is used. Specifically, since 701d has a higher saturation than 702d, mapping is performed such that 711d has a higher saturation than 712d. In this manner, the relative color positional relation is maintained also after mapping by using the same mapping algorithm for the light sources. For example, the relative positional relation between 701a, 702a, 701d and 702d is similar to that between 711a, 712a, 711d and 712d. In this manner, variation in the color of the subject that is dependent on differences in the light sources can be reproduced in the output image.

In mapping processing, all colors included in the Lab image can be compressed within the color reproduction range. With respect to the distribution of the colors included in the Lab image, discrete Lab values for all pixels may be used. Also, a solid (input gamut) that includes all the pixels included in the Lab image may be obtained or acquired for each light source. For example, the input gamut may be generated by a method such as the convex hull method or the like, based on the Lab values of all pixels in the input image. As the input gamut, the color reproduction range under each light source of the spectral image input apparatus 108 may be acquired.

A color separation unit 214 converts the color-compressed image generated by the mapping unit 210 into an output signal sent to the image output apparatus 109 (color separation unit). In the present embodiment, the color separation unit 214 generates one output signal having CMYKRGB values from five types of color-compressed images having L'a'b' values. Specifically, the color separation unit 214 causes the optimization unit 211 to perform conversion from the L'a'b' values to the CMYKRGB values.

The optimization unit 211 converts a plurality of combinations of L'a'b' values into the CMYKRGB values. The optimization unit 211 comprises the device model unit 212 and a model inversing unit 213. The device model unit 212 estimates the spectral reflectance of the color that the image output apparatus 109 outputs according to the output signal having specific CMYKRGB values. The model inversing unit 213 repetitively drives the device model unit 212 and the color information conversion unit 207. In this manner, the model inversing unit 213 adjusts the CMYKRGB values such that the color output by the image output apparatus 109 fully reproduces each combination of L'a'b' values. In this manner, the model inversing unit 213 obtains the CMYKRGB values. Specific processing performed by the optimization unit 211 will be described below.

The image output unit 215 sends the output signal generated by the color separation unit 214 (output information) to the image output apparatus 109 (output unit). The image output unit 215 can send, in addition to the output signal, various types of control information for controlling the image output apparatus 109 to the image output apparatus 109. The image output apparatus 109 outputs images according to the information sent by the image output unit 215. The image output unit 215 may save the output signal and control information in an external storage apparatus, not shown in the drawings. In this case, data may be transferred from the external storage apparatus to the image output apparatus 109.

Figure 3:
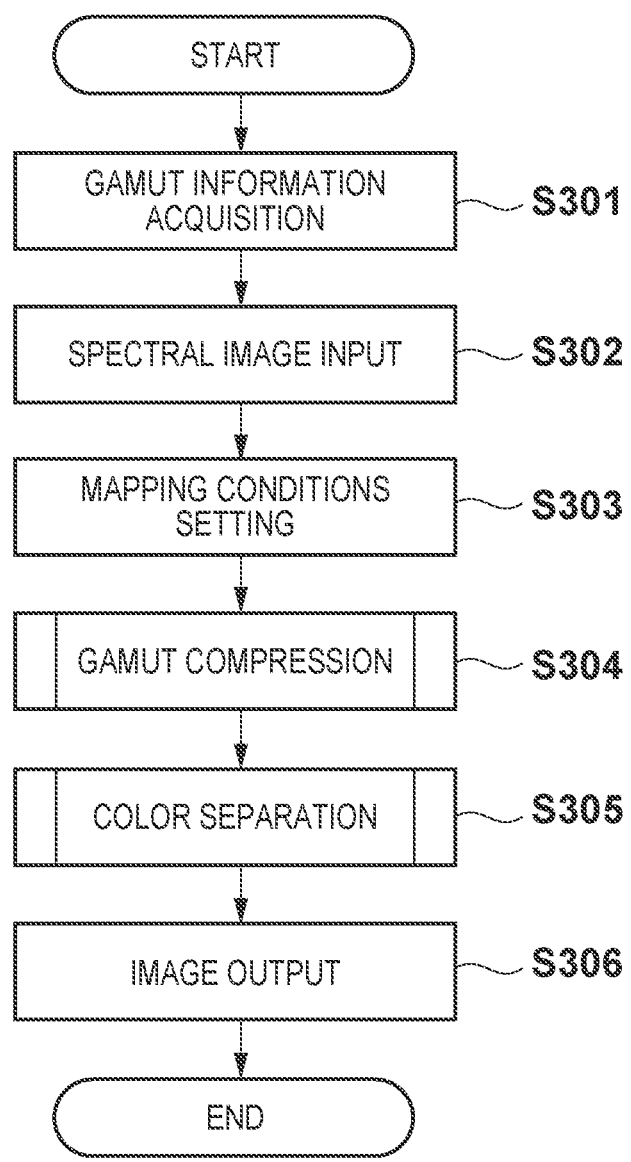
FIG. 3 is a flowchart showing the flow of an image processing method in Embodiment 1.

Next, the flow of the processing performed by the color processing apparatus 101 will be described with reference to the flowchart in FIG. 3. In step S301, the gamut information acquisition unit 209 acquires the gamut information 223. In step S302, the image input unit 203 acquires the spectral image 221. In step S303, the mapping unit 210 sets mapping conditions. For example, the mapping unit 210 may acquire a user input designating mapping conditions. As described above, in the present embodiment, the brightness of the input image is maintained, and an algorithm that places an emphasis on maintaining the tonality of the image is used. In addition, in step S303, the type of the light source to be considered is set. In the present embodiment, five types of light sources, namely, D65, A, F2, F7 and F11, are considered as described above. In step S304, the color-compressed image is generated from the spectral image 221 according to the mapping conditions set in step S303.

Figure 6:
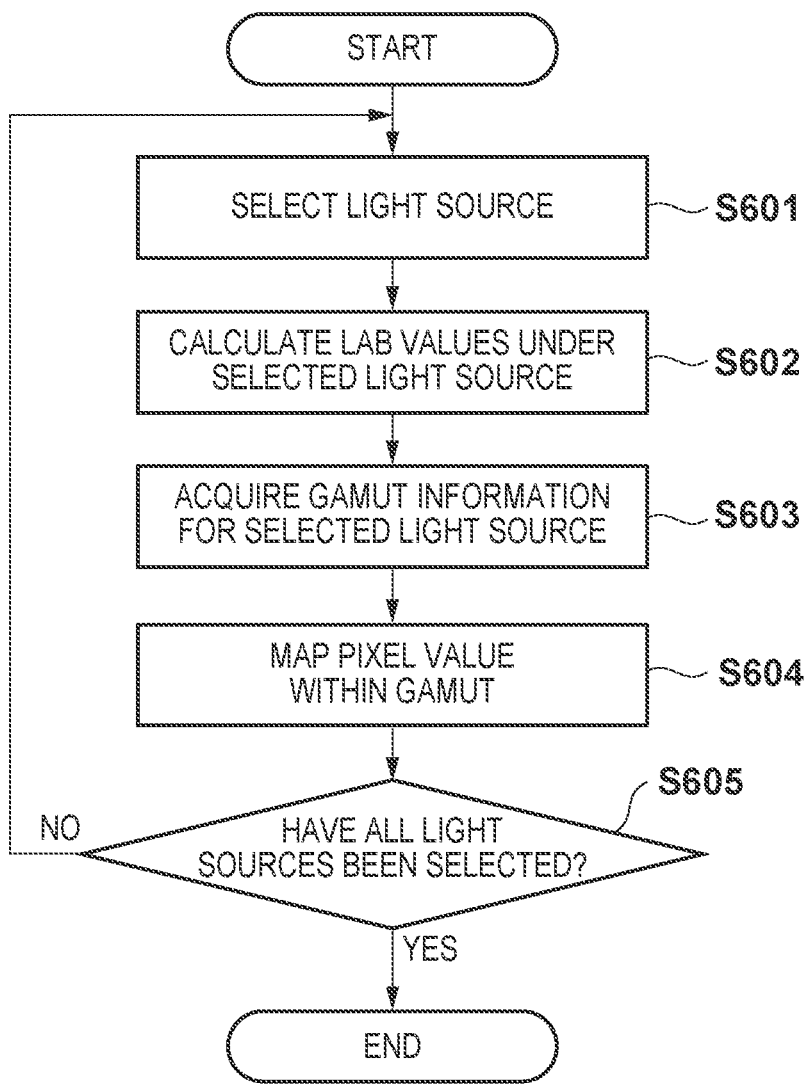
FIG. 6 is a flowchart showing the flow of gamut compression processing in Embodiment 1.

Processing performed in step S304 will be described in detail with reference to the flowchart in FIG. 6. In step S601, the mapping unit 210 selects one of the above-mentioned five types of light sources. In step S602, the image conversion unit 208 converts the spectral image 221 into a Lab image according to the light source information 222 of the light source selected in step S601. In step S603, the mapping unit 210 acquires the gamut information 223 of the light source selected in step S601.

In step S604, the mapping unit 210 maps pixel values of the Lab image obtained in step S602 within the gamut indicated by the gamut information 223 according to the mapping conditions set in step S303. In this manner, the mapping unit 210 generates the color-compressed image for the light source selected in step S601. In step S605, the mapping unit 210 determines whether there is a light source that has not been selected in step S601. If there is a light source that has not been selected, the processing returns to step S601, and next light source is selected. If all light sources have been selected, the processing advances to step S305. In the present embodiment, mapping processing is performed in order for each light source. However, mapping processing for each light source may be performed in parallel.

Figure 8:
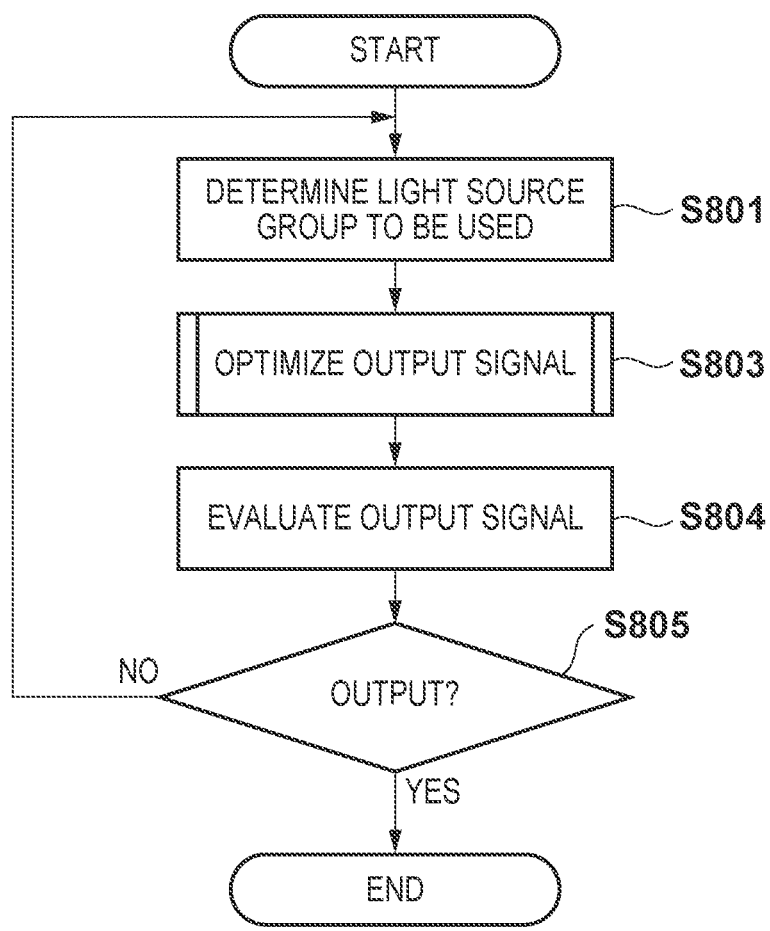
FIG. 8 is a flowchart showing the flow of color separation processing in Embodiment 1.

In step S305, the color separation unit 214 generates an output signal from the color-compressed images for the respective light sources. The processing performed in step S305 will be described in detail with reference to the flowchart in FIG. 8. In step S801, the color separation unit 214 selects a combination of light sources used for generating the output signal. The color separation unit 214 selects all or some of the light sources set in step S303 as the light sources used for generating the output signal. In the present embodiment, in step S801, which is the first step performed after starting the processing in step S305, all the light sources set in step S303 are selected.

In the case where step S801 is executed after the branch in step S805, some of the light sources set in step S303 are selected. If it has been determined that it is impossible to perform color reproduction with an accuracy that is greater than or equal to a threshold under all the light sources selected in step S801, the processing returns from step S805 to step S801. In this case, in the present embodiment, the light sources are removed from the selected light sources one by one starting from the light source having the lowest priority. The method for selecting the combined light sources is not limited to this. For example, a different combination of light sources that includes the same number of light sources as that of the previous combination may be selected when the processing is returned from the branch in step S805. For example, after a combination of D65, A, F2 and F7 is selected, a combination of D65, A, F2 and F11 may be selected. In addition, every time the processing in step S801 is executed, a user input indicating a combination of light sources may be received. The color separation unit 214 can select a combination of two or more light sources.

In step S803, the color separation unit 214 determines the output signal value for each pixel position. Specifically, the color separation unit 214 acquires the pixel value corresponding to a certain pixel in the spectral image 221 from each of the color-compressed images corresponding to the light sources selected in step S801. Then, the color separation unit 214 determines the pixel value for the output signal using the acquired pixel values. By repeating this processing for each pixel in the spectral image 221, the output signal corresponding to the spectral image 221 is generated. The color separation unit 214 may perform the processing on each pixel in the spectral image 221 in parallel.

In this manner, in step S803, the color separation unit 214 derives an output signal that favorably reproduces the combination of L'a'b' values obtained in step S304 under all the light sources selected in step S801. Specifically, the color separation unit 214 adjusts the output signal so as to achieve the smallest error between the colorimetric values that are obtained by measuring the color output by the image output apparatus 109 according to the output signal under each of the light source and the L'a'b' values for the light sources.

Figure 9:
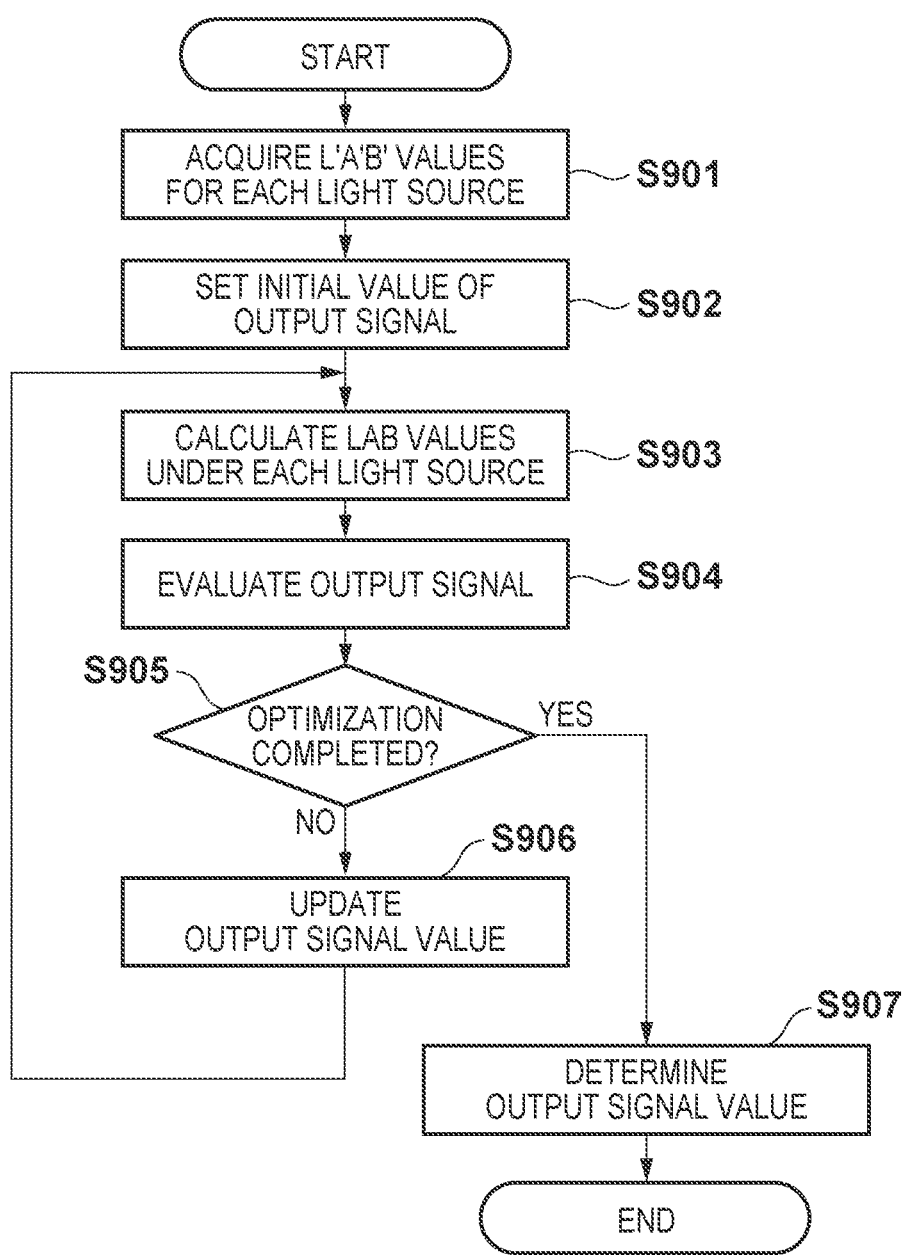
FIG. 9 is a flowchart showing the flow of optimization processing in Embodiment 1.

The processing performed in step S803 will be described below in detail with reference to the flowchart in FIG. 9. In the description given below, the case in which the output signal is derived for one pixel in the spectral image 221 will be described. By performing the processing described below on each pixel in the spectral image 221, the output signal can be derived for each pixel in the spectral image 221.

In step S901, the color separation unit 214 acquires the L'a'b' values for each of the light sources selected in step S801 from the color-compressed image. In step S902, the color separation unit 214 sets an initial value of the signal value. Any value may be used as the initial value, and in this embodiment, the value is set such that {C, M, Y, K, R, G, B}={0, 0, 0, 0, 0, 0, 0}.

Next, the model inversing unit 213 repeats processing from step S903 to step S906, and thus repeats calculation and evaluation of the signal value. By these processes, the model inversing unit 213 optimizes the output signal value (ink value). The model inversing unit 213 obtains an evaluation value for the calculated signal value. Then, the model inversing unit 213 holds a signal value having the highest evaluation value among the signals that have been estimated as a provisional solution, and holds the evaluation value for the provisional solution as well. As described above, in the present embodiment, the initial value of the signal value is set such that {C, M, Y, K, R, G, B}={0, 0, 0, 0, 0, 0, 0}, and the initial value of the evaluation value is set to infinite or a sufficiently large value.

In step S903, the model inversing unit 213 causes the device model unit 212 to estimate the spectral reflectance from the signal value. In the present embodiment, the device model unit 212 estimates the spectral reflectance using the cellular Yule-Nielsen Spectral Neugebauer Model. Note that the method for calculating the spectral reflectance is not limited thereto. Parameters necessary for estimating the spectral reflectance can be acquired by, for example, the gamut information acquisition unit 209. Furthermore, in step S903, the model inversing unit 213 causes the color information conversion unit 207 to calculate the device-independent color information under each light source from the estimated spectral reflectance. Specifically, the color information conversion unit 207 calculates the Lab values under each light source using light source information of each of the light sources selected in step S801.

In step S904, the model inversing unit 213 evaluates the Lab values calculated in step S903. In the present embodiment, the model inversing unit 213 evaluates the difference between the L'a'b' values acquired in step S901 and the Lab values calculated in step S903. Specifically, the model inversing unit 213 calculates a color difference ΔE between the L'a'b' values acquired in step S901 and the Lab values calculated in step S903 for each of the light sources selected in step S801.

The model inversing unit 213 sets the largest color difference ΔE of the color differences ΔE calculated for the light sources selected in step S801 as the evaluation value for the signal value. In the present embodiment, the smaller the color difference ΔE, that is, the smaller the evaluation value, the higher the evaluation of the signal value. Then, the model inversing unit 213 compares the evaluation value of the signal value with the evaluation value of the provisional solution, and if the evaluation value of the signal value is higher than the evaluation value of the provisional solution, the provisional solution and the evaluation value are updated. Specifically, in the present embodiment, if the evaluation value of a signal value is smaller than the evaluation value of the provisional solution, that signal value is used as a new provisional solution, and the evaluation value of the signal value is used as a new evaluation value of the provisional solution.

Although the color difference ΔE is used as the evaluation value in the present embodiment, the evaluation value may be obtained by other methods. At this time, a high evaluation should be given in the case where the color (L'a'b' values) under each light source that is obtained from the spectral image 221 and the light source information 222 is similar to the color (color calculated in step S903) under the light source that is obtained from the signal value and the light source information 222. Although the largest color difference ΔE of the color differences ΔE obtained for the light sources is used as the evaluation value in the present embodiment, a value obtained by other statistical methods, for example, an average of the color differences ΔE may be used as the evaluation value.

In step S905, the model inversing unit 213 determines whether optimization has been completed. If optimization is continued, the model inversing unit 213 corrects parameters (signal value) in step S906. Then, the processing returns to step S903, where the model inversing unit 213 evaluates the signal value again. In the present embodiment, determination as to completion of optimization in step S905 and correction of parameters in step S906 are performed based on Newton's iteration method. Note that various types of other optimization methods and search methods may be used. For example, the simplex method, the particle swarm optimization method or the like may be used. Processing performed by using any of the above-described methods is included in the scope of the present invention.

If it is determined in step S905 that optimization has been completed, the processing advances to step S907. In step S907, the model inversing unit 213 determines that the provisional solution at that time is the signal value that best reproduces the combination of the L'a'b' values obtained in step S901. The model inversing unit 213 outputs the provisional solution at that time to the color separation unit 214 as the output signal value. The model inversing unit 213 further outputs the evaluation value for the provisional solution to the color separation unit 214. By performing the processing in step S803 on each pixel of the input image, the output signal value (i.e., output signal) for each pixel and the evaluation value for the output signal value are determined.

In step S804, the color separation unit 214 evaluates the output signal generated in step S803. In step S805, the color separation unit 214 determines whether or not to output the output signal generated in step S803 based on the evaluation made in step S804. Evaluation in step S804 may be performed automatically, or acquired from the user. In the case where evaluation is performed automatically, the evaluation can be performed by using the evaluation value for the output signal value that has been determined in step S803.

For example, the color separation unit 214 can evaluate the entire output signal using the evaluation values for the pixels. Specifically, the color separation unit 214 may determine that the accuracy of an output signal is high and decide to output the output signal if the evaluation values for all or a predetermined number of the pixels are less than a threshold. As described above, in the case where an evaluation value has the largest color difference ΔE of the color differences ΔE for the light sources, the fact that that evaluation value is less than or equal to the threshold means that the color difference ΔE for all the light sources are less than or equal to the threshold. Also, when the user performs evaluation, the color separation unit 214 may estimate how the image output by the image output apparatus 109 according to the output signal may appear under each light source. The estimated look of the image can be presented to the user through the monitor 107. The user who viewed the presented look may input an instruction indicating whether or not to output the output signal to the color processing apparatus 101.

If the color separation unit 214 has determined to output the output signal in step S805, the processing advances to step S306. In step S306, the image output unit 215 outputs the output signal generated in step S803 to the image output apparatus 109. If the color separation unit 214 decides not to output the output signal in step S805, the processing returns to step S801. When the processing returns to step S801, as described above, a different combination of light sources is selected, and the output signal is generated again.

Generally, the smaller the number of the selected light source, the less strict the constraints. Therefore, it is possible to improve color reproduction accuracy under the selected light sources by reducing the number of selected light sources. In the case where the output signal having a sufficient accuracy cannot be obtained even after sufficiently reducing the number of the selected light sources, the color separation unit 214 may notify the user that this is the case. In addition, the color separation unit 214 may decide to cancel the image output or to perform the image output using the obtained output signal. The color processing apparatus 101 may automatically select to cancel or perform the image output, or the selection may be made according to the user's instruction. The output signal to be output out of a plurality of output signals generated in step S803 may be decided according to the user's instruction. The color separation unit 214 may evaluate the entire output signal based on the evaluation values of the pixels, and output the output signal having the highest evaluation.

The above is the end of the description of the color processing apparatus 101 according to the present embodiment and processing performed thereby. With the present embodiment, it is possible to reproduce relative color difference under each light source in the output image. Furthermore, even if some of the colors indicated by the input spectral image are out of the reproduction range of the output apparatus, it is possible to output an image while maintaining the hue of the colors indicated by the spectral image, tonality, feeling, and the like of the image.

The processing method according to the present embodiment can be realized by various forms. For example, the method according to the present embodiment can be realized by using an image output apparatus, a computer program, a computer-readable storage medium or the like. Furthermore, the processing method according to the present embodiment (or the color processing apparatus according to the present embodiment) may be realized by using a system configured by a plurality of devices.

Also, the color processing apparatus according to the present embodiment may be capable of generating spectral images, or outputting images to a recording medium. Furthermore, the color processing apparatus according to the present embodiment may have functions equivalent to those of the spectral reflectance measurement apparatus 110. In this case, the color processing apparatus according to the present embodiment can itself acquire the gamut information 223.

The spectral image 221 is input in the present embodiment. That is, color information for a plurality of pixels is input, and the output signal values for the plurality of pixels are sent to the image output apparatus 109. However, the color processing apparatus 101 according to the present embodiment can receive input of a piece of color information and output the output signal corresponding to that color information.

[Embodiment 2]

Hereinafter Embodiment 2 of the present invention will be described. In the present embodiment, the color processing apparatus 101 is realized using a general purpose computer. The hardware configuration of the color processing apparatus 101 according to the present embodiment will be described with reference to FIG. 1. The color processing apparatus 101 according to the present embodiment is a general purpose computer, and includes a CPU 102, a main memory 103, a HDD 104, a general purpose interface 105, and a bus 106.

A general purpose operating system (OS) operates on the color processing apparatus 101 according to the present embodiment. By operating a color processing application on the OS, it is possible to allow the color processing apparatus 101 according to the present embodiment to perform operations similar to those of Embodiment 1. That is, by the CPU 102 controlling operation of the units of the computer based on the color processing application program, it is possible to realize the color processing apparatus 101 according to the present embodiment. The color processing application program is stored in the HDD 104 in the present embodiment. However, the color processing application program may be stored in other storage media, such as a CD and a DVD. Specific design of the general purpose OS and the color processing application according to the present embodiment may be possible with the present invention by those skilled in the art. Therefore, the specific method for operating the color processing application on the general purpose OS will not be described.

In the present embodiment, the color processing application program stored in the HDD 104 is activated by the instruction from the CPU 102. The color processing application program is loaded on the main memory 103. A screen may be displayed on the monitor 107 according to the control by the CPU 102 based on the color processing application program. Next, based on the color processing application program, data stored in the HDD 104, or measurement values input from the spectral reflectance measurement apparatus 110 or the spectral radiance measurement apparatus 111 are transferred to the main memory 103 via the bus 106.

The spectral reflectance measurement apparatus 110 can measure the image output by the image output apparatus 109 based on the control by the CPU 102. Similarly, the spectral radiance measurement apparatus 111 can measure the spectral radiance of the light source based on the control by the CPU 102. Furthermore, the CPU 102 performs computation using the data stored in the main memory 103 based on the color processing application. The computation results may be displayed on the monitor 107 via the bus 106, or may be stored in the HDD 104.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-277420, filed on Dec. 13, 2010, which is hereby incorporated by reference herein in its entirety.

What is claimed is:

1. A color processing apparatus that calculates, from a spectral image having spectral reflectance information that indicates spectral characteristics of a color of each pixel of the spectral image, output information that indicates an intensity of each of a plurality of color components that an image output apparatus uses for outputting the spectral image, the color processing apparatus comprising:

an acquisition unit configured to acquire the spectral image;

a calculation unit configured to calculate, for each of a plurality of light sources, a first colorimetric value that is obtained by measuring a color having a spectral reflectance indicated by each pixel of the spectral image under the light source;

an input gamut obtaining unit configured to obtain, for each of the plurality of light sources, first gamut information indicating a gamut of the spectral image;

an output gamut obtaining unit configured to obtain, for each of the plurality of light sources, second gamut information indicating a gamut of the image output apparatus;

a mapping unit configured to obtain, for each of the plurality of light sources, a second colorimetric value by mapping the first colorimetric value of the light source within the gamut of the image output apparatus based on the first gamut information and the second gamut information of each of the plurality of light sources;

a color separation unit configured to obtain the output information from a plurality of the second colorimetric values, by determining the output information such that an error between a colorimetric value obtained by measuring a color output by the image output apparatus according to the output information under each of the light sources and the second colorimetric value for the light source is minimized; and an output unit configured to output the output information.

2. The color processing apparatus according to claim 1, wherein said color separation unit is further configured to obtain the output information such that a color difference between a color indicated by the colorimetric value obtained by measuring the color output by the image output apparatus according to the output information under each of the light sources and a color indicated by the second colorimetric value for the light source is less than or equal to a threshold with respect to all the plurality of light sources.

3. The color processing apparatus according to claim 1, wherein in a case where said color separation unit cannot obtain output information with which a color difference between a color indicated by the colorimetric value obtained by measuring the color output by the image output apparatus according to the output information under each of the light sources and a color indicated by the second colorimetric value for the light source is less than or equal to a threshold with respect to all the plurality of light sources, said color separation unit is further configured to select two or more light sources from among the plurality of light sources, and obtain the output information such that the color difference between a color indicated by the colorimetric value obtained by measuring the color output by the image output apparatus according to the output information under each of the light sources and a color indicated by the second colorimetric value for the light source is less than or equal to a threshold with respect to each of the selected light sources.

4. A color processing method for calculating, from a spectral image having spectral reflectance information that indicates spectral characteristics of a color of each pixel of the spectral image, output information that indicates an intensity of each of a plurality of color components that an image output apparatus uses for outputting the spectral image, the color processing method comprising the steps of:

acquiring the spectral image;

calculating, for each of a plurality of light sources, a first colorimetric value that is obtained by measuring a color having a spectral reflectance indicated by each pixel of the spectral image under the light source;

obtaining, for each of the plurality of light sources, first gamut information indicating a gamut of the spectral image;

obtaining, for each of the plurality of light sources, second gamut information indicating a gamut of the image output apparatus;

obtaining, for each of the plurality of light sources, a second colorimetric value by mapping the first colorimetric value of the light source within the gamut of the image output apparatus based on the first gamut information and the second gamut information of each of the plurality of light sources;

obtaining the output information from a plurality of the second colorimetric values, by determining the output information such that an error between a colorimetric value obtained by measuring a color output by the image output apparatus according to the output information under each of the light sources and the second colorimetric value for the light source is minimized; and outputting the output information.

5. A non-transitory computer-readable storage medium storing a computer program for causing a computer to function as each unit of the color processing apparatus according to claim 1.

6. The color processing apparatus according to claim 1, wherein the input gamut obtaining unit generates the first gamut information from a distribution of the first colorimetric values for each pixel.

7. The color processing apparatus according to claim 1, wherein the input gamut obtaining unit generates the first gamut information from a distribution of the first colorimetric values for each pixel using convex hull method.

8. The color processing apparatus according to claim 1, wherein said color separation unit is further configured to obtain the output information by repeating the following steps until an evaluation value becomes less than or equal to a threshold:

determining preliminary output information;

determining an error, for each of the plurality of light sources, between a colorimetric value obtained by measuring a color output by the image output apparatus according to the preliminary output information under the light source and the second colorimetric value for the light source; and determining one evaluation value based on a plurality of the determined errors for the plurality of light sources.

* * * * *